(12) United States Patent
Giovannini et al.

(10) Patent No.: US 12,608,647 B2
(45) Date of Patent: Apr. 21, 2026

(54) MULTIMODAL DATA INFERENCE

(71) Applicant: International Business Machines Corporation, Armonk, NY (US)

(72) Inventors: Andrea Giovannini, Zurich (CH); Antonio Foncubierta Rodriguez, Zurich (CH); Niharika DSouza, San Jose, CA (US); Tanveer Syeda-Mahmood, Cupertino, CA (US); Hongzhi Wang, Santa Bruno, CA (US)

(73) Assignee: International Business Machines Corporation, Annonk, NY (US)

( * ) Notice: Subject to any disclaimer, the term of this patent is extended or adjusted under 35 U.S.C. 154(b) by 983 days.

(21) Appl. No.: 17/806,556

(22) Filed: Jun. 13, 2022

(65) Prior Publication Data

US 2023/0401479 A1    Dec. 14, 2023

(51) Int. Cl.
  *G06N 20/00*     (2019.01)
  *G06N 3/042*     (2023.01)
      (Continued)

(52) U.S. Cl.
  CPC ............. *G06N 20/00* (2019.01); *G06N 3/042* (2023.01); *G06N 3/0455* (2023.01); *G06N 3/09* (2023.01); *G06N 5/04* (2013.01)

(58) Field of Classification Search
  CPC .......... G06N 20/00; G06N 5/04; G06N 3/048; G06N 3/0455; G06N 3/0895; G06N 3/042;
      (Continued)

(56) References Cited

U.S. PATENT DOCUMENTS

| | | | |
|---|---|---|---|
| 9,542,626 | B2 | 1/2017 | Martinson et al. |
| 10,402,697 | B2 | 9/2019 | Yang et al. |
| 2021/0150315 | A1 | 5/2021 | Dang et al. |

FOREIGN PATENT DOCUMENTS

| | | |
|---|---|---|
| CN | 111597830 A | 8/2020 |
| CN | 112288091 A | 1/2021 |

OTHER PUBLICATIONS

Baltrušaitis, Tadas, Chaitanya Ahuja, and Louis-Philippe Morency. "Multimodal Machine Learning: A Survey and Taxonomy." arXiv preprint arXiv:1705.09406v2 (2017). (Year: 2017).*

(Continued)

*Primary Examiner* — Matthew Ell
*Assistant Examiner* — Blaine T Basom
(74) *Attorney, Agent, or Firm* — Jeffrey M. Ingalls

(57) ABSTRACT

Computer-implemented methods are provided for generating machine learning model for multimodal data inference tasks. Such a method includes, for each sample in a training dataset of multimodal data samples, encoding the sample to produce a compressed vector representation of the sample in a k-dimensional latent space, and perturbing features of the sample to identify, for each dimension of the latent space, a set of active features perturbation of each of which produces more than a threshold change in the vector representation in that dimension. The method further comprises generating a sample graph having nodes interconnected by edges, wherein the nodes comprise nodes representing respective said features of the sample and edges interconnecting nodes indicate the active features for each dimension. The sample graph is then used to train a graph neural network model to perform the multimodal data inference task. Multimodal data inference systems employing such models are also provided.

20 Claims, 8 Drawing Sheets

(51) Int. Cl.
   *G06N 3/0455* (2023.01)
   *G06N 3/09* (2023.01)
   *G06N 5/04* (2023.01)
(58) Field of Classification Search
   CPC .......... G06N 3/084; G06N 3/09; G16H 30/40;
   G16H 50/20
   See application file for complete search history.

(56) References Cited

OTHER PUBLICATIONS

Holzinger, Andreas, et al. "Towards multi-modal causability with graph neural networks enabling information fusion for explainable AI." Information Fusion 71 (2021): 28-37. (Year: 2021).*

Duan, Jingwen, et al. "Multimodal graph inference network for scene graph generation." Applied Intelligence 51.12 (2021): 8768-8783. (Year: 2021).*

Ivanovs, Maksims, Roberts Kadikis, and Kaspars Ozols. "Perturbation-based methods for explaining deep neural networks: A survey." Pattern Recognition Letters 150 (2021): 228-234. (Year: 2021).*

Zheng, Shuai, et al. "Multi-modal Graph Learning for Disease Prediction." arXiv preprint arXiv:2203.05880v1 (2022). (Year: 2022).*

Anonymous, "Method for Training Model for Multiple Modalities," https://priorart.ip.com/IPCOM/000261603, IP.com No. IPCOM000261603D, Mar. 20, 2020, 5 pgs.

Bayoudh et al., "A survey on deep multimodal learning for computer vision: advances, trends, applications, and datasets," https://link.springer.com/article/10.1007/s00371-021-02166-7, May 15, 2021, 32 pgs.

Chen et al., "HGMF: Heterogeneous Graph-based Fusion for Multimodal Data with Incompleteness," Research Track Paper, KDD'20, Aug. 23-27, 2020, Virtual Event, USA, 11 pgs.

Cozzo et al., "Multiplex Networks: Basic Formalism and Structural Properties," Springer Briefs in Complexity, © 2018 The Authors, https://doi.org/10.1007/978-3-319-9225-3_1, 124 pgs.

Defferrard et al., "Convolutional Neural Networks on Graphs with Fast Localized Spectral Filtering," 30th Conference on Neural Information Processing Systems (NIPS 2016), Barcelona, Spain, 9 pgs.

Gao et al., "Multi-Modal Graph Neural Network for Joint Reasoning on Vision and Scene Text," https://vipl.ict.ac.cn/uploadfile/upload/2020061711115545.pdf, pp. 12746-12756, 2020.

Hamilton et al., "Inductive Representation Learning on Large Graphs," 31st Conference on Neural Information Processing Systems (NIPS 2017), Long Beach, CA, USA, 11 pgs.

Holzinger et al., "Towards multi-modal causability with Graph Neural Networks enabling information fusion for explainable AI," https://www.sciencedirect.com/science/article/pii/S1566253521000142, Information Fusion 71 (2021) 28-37.

Kazi et al., "Differentiable Graph Module (DGM) for Graph Convolutional Networks," arXiv:2002.04999.v3 [cs.LG] Jun. 17, 2020, 10 pgs.

Kipf et al., "Semi-Supervised Classification with Graph Convolutional Networks," arXiv:1609.02907v4 [cs.LG] Feb. 22, 2017, 14 pgs.

Ma et al., "Multi-dimensional Graph Convolutional Networks," https://pennstate.pure.elsevier.com/en/publications/multi-dimensional-graph-convolutional-networks, © 2019 by SIAM, 9 pgs.

Schlichtkrull et al., "Modeling Relational Data with Graph Convolutional Networks," arXiv:1703.06103v4 [state.ML] Oct. 26, 2017, 9 pgs.

Shuman et al., "The Emerging Field of Signal Processing on Graphs," Extending High-Dimensional Data Analysis to Networks and Other Irregular Domains, arXiv:1211.0053v2 [cs.DM] Mar. 10, 2013, 14 pgs.

Subramanian et al., "Multimodal Fusion Using Sparse CCA for Breast Cancer Survival Prediction," arXiv:2103.05432v1 [cs.LG] Mar. 9, 2021, 4 pgs.

Vivar et al., "Multi-modal Graph Fusion for Inductive Disease Classification in Incomplete Datasets," arXiv:1905.03053v1 [cs.LG] May 8, 2019, 9 pgs.

Wang et al., "Modeling Uncertainty in Multi-Modal Fusion for Lung Cancer Survival Analysis," 2021 IEEE 18th International Symposium on Biomedical Imaging (ISBI), 4 pgs., Apr. 13-16, 2021, Nice, France.

Xu et al., "How Powerful are Graph Neural Networks?" Published as a conference paper at ICLR 2019, arXiv:1810.00826v3 [cs.LG] Feb. 22, 2019, 17 pgs.

Yin et al., "A Novel Graph-based Multi-modal Fusion Encoder for Neural machine Translation," https://arxiv.org/pdf/2007.08742.pdf, 11 pgs.

Zhang t al., "Multi-modal Graph Fusion for Named Entity Recognition with Targeted Visual Guidance," The Thirty-Fifth AAAI Conference on Articial Intelligence (AAAI-21), https://ojs.aaai.org/index.php/AAAI/article/view/17687, © 2021 Association for the Advancement of Artificial Intelligence, pp. 14347-14355.

* cited by examiner

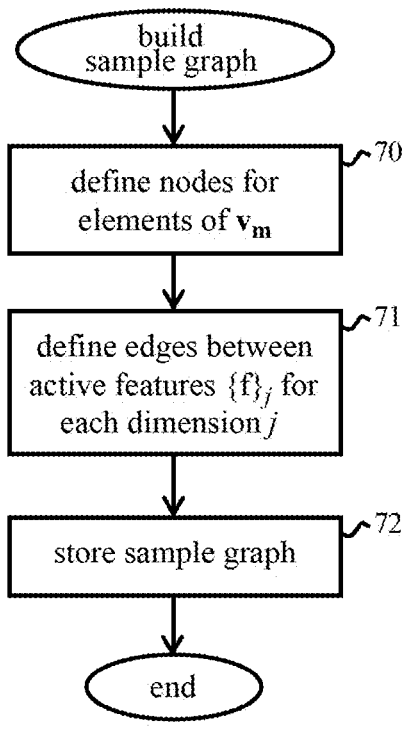
define nodes for
elements of $\mathbf{v_m}$ ⌐70
define edges between
active features $\{f\}_j$ for
each dimension $j$ ⌐71
store sample graph ⌐72
FIG. 8
$j = 1$
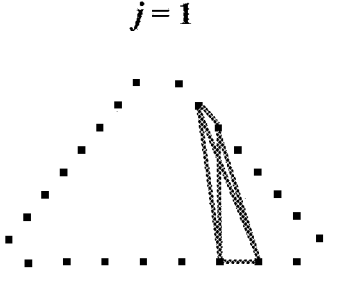
$j = 2$
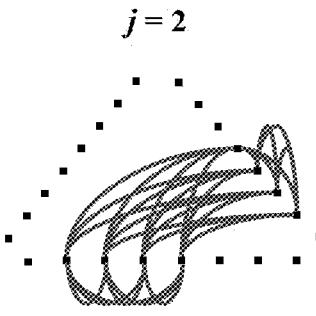
FIG. 9A          FIG. 9B

$j = 3$ $j = 4$ multimodal sample graph

| Modality | CT | SNP | Demographic | Clinical | Regimen | Cont |
|---|---|---|---|---|---|---|
| Nat. Dim. | 81 | 48 | 29 | 1726 | 233 | 8 |
| Rank | 55 | 48 | 24 | 183 | 112 | 8 |
| Red. Dim. | 32 | 32 | 8 | 128 | 64 | 4 |

| Class | Result |
|---|---|
| 0 | 0.74 |
| 1 | 0.71 |
| 2 | 0.72 |
| 3 | 0.65 |
| 4 | 0.70 |
| Overall | 0.71 |

MULTIMODAL DATA INFERENCE

BACKGROUND

The present disclosure relates generally to the field of machine learning and, more specifically, to generating machine learning models for multimodal data inference tasks.

Machine learning is a cognitive computing technique that allows a processing system to "learn" procedures for tackling complex tasks which are not programmed in a conventional manner. Machine learning (ML) models based on artificial neural networks perform computational tasks in a manner inspired by biological architectures of the nervous system in which a network of neurons are interconnected via synapses which relay weighted signals between the neurons. The strength of these signals depends on synaptic conductance, or "weight", which can be modified by neuronal activity, and this weight modification ("synaptic plasticity") provides a basis for learning. Artificial neural networks (ANNs) employ a logical construction in which weighted signals are relayed between a network of processing units emulating neurons. The network is typically arranged as a series of layers in which signals are propagated from an input to an output layer which provides the network output. Neural network models can be trained by exposing the network to a (typically massive) dataset of training data samples from a real-world application in order to optimize the model for a required task. Training is an iterative process in which training samples are repeatedly supplied to the network and the network weights are progressively updated, based on the network output, so as to optimize a loss function for the network. The trained model, with weights optimized via the training process, can then be applied for inference to new (previously unseen) data samples for the application task in question.

Machine learning techniques are used in numerous applications in science and technology including medical diagnosis, genetic analysis, pharmaceutical drug design, computer vision and autonomous driving, among many other technical applications. Often in such applications, information relevant to an inference task is embedded in different modalities of data. In healthcare applications, for example, medical evaluations may be based on multiple data modalities such as image data (e.g., X-ray, CT (Computerized Tomography), MRI (Magnetic Resonance Imaging) scans and/or pathology images with various stains), along with clinical data, genomics data, demographic data, and so on. Evidence for an inference task can be distributed across multiple such modalities, while data from any single modality may be too weak to draw good conclusions. ML inference models for these applications can be designed to process multimodal data samples, each comprising a plurality of different data modalities, whereby information from all modalities is accommodated in inference results from the model.

SUMMARY

An embodiment of the present disclosure provides a computer-implemented method for generating a machine learning model for a multimodal data inference task. The method includes, for each sample in a training dataset of multimodal data samples, encoding the sample to produce a compressed vector representation of the sample in a k-dimensional latent space, and perturbing features of the sample to identify, for each dimension of the k-dimensional latent space, a set of active features perturbation of each of which produces more than a threshold change in the compressed vector representation in that dimension. The method further comprises generating a sample graph having nodes interconnected by edges, wherein the nodes comprise nodes representing respective said features of the sample and edges interconnecting nodes indicate the active features for each dimension. The sample graph is then used to train a graph neural network model to perform the multimodal data inference task.

Another embodiment of the present disclosure provides a computer program product comprising a computer readable storage medium embodying program instructions, executable by a computing system, to cause the computing system to implement a method for generating a machine learning model as described above.

Another embodiment of the present disclosure provides a multimodal data inference system comprising a sample graph generator and a graph neural network model. The sample graph generator is adapted to encode an input multimodal data sample to produce a compressed vector representation of the sample in the k-dimensional latent space, to perturb features of the sample to identify a set of active features as described above, and to generate the sample graph for the sample. The graph neural network model is pretrained to perform a multimodal data inference task using sample graphs generated by the sample graph generator for respective samples in a training dataset of multimodal data samples. The sample graph generator is adapted to supply the sample graph for the input multimodal data sample to the graph neural network model to obtain an inference output for the sample.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 8 illustrates steps of sample graph generation process in the FIG. 3 method, in accordance with some embodiments of the present disclosure.

FIG. 9A-9E illustrate sample graph construction for an example of the FIG. 8 method, in accordance with some embodiments of the present disclosure.

Figure 1:
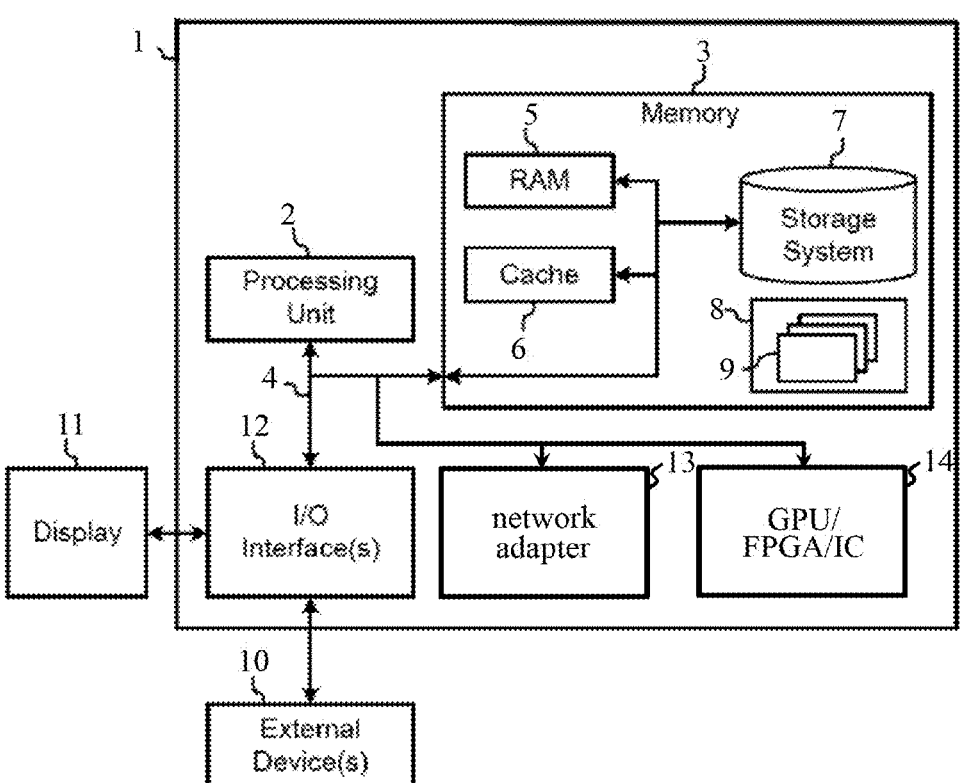
FIG. 1 illustrates a schematic representation of a computing system for implementing methods of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of machine learning and, more particularly, to generating machine learning models for multimodal data inference tasks. While the present disclosure is not necessarily limited to such applications, various aspects of the disclosure may be appreciated through a discussion of various examples using this context.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments to be described can be performed as computer-implemented methods for generating ML models for multimodal data inference tasks. Such methods may be implemented by a computing system comprising one or more general- or special-purpose computers, each of which may comprise one or more (real or virtual) machines, providing functionality for implementing operations described herein. Steps of methods embodying the invention may be implemented by program instructions, e.g., program modules, implemented by a processing apparatus of the system. Generally, program modules may include routines, programs, objects, components, logic, data structures, and so on that perform particular tasks or implement particular abstract data types. The computing system may be implemented in a distributed computing environment, such as a cloud computing environment, where tasks are performed by remote processing devices that are linked through a communications network. In a distributed computing environment, program modules may be located in both local and remote computer system storage media including memory storage devices.

Referring now to FIG. 1, shown is a block diagram of exemplary computing apparatus for implementing methods embodying the present disclosure. The computing apparatus is shown in the form of a general-purpose computer 1. The components of computer 1 may include processing apparatus such as one or more processors represented by processing unit 2, a system memory 3, and a bus 4 that couples various system components including system memory 3 to processing unit 2.

Bus 4 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 1 typically includes a variety of computer readable media. Such media may be any available media that is accessible by computer 1 including volatile and non-volatile media, and removable and non-removable media. For example, system memory 3 can include computer readable media in the form of volatile memory, such as random-access memory (RAM) 5 and/or cache memory 6. Computer 1 may further include other removable/non-removable, volatile/non-volatile computer system storage media. By way of example only, storage system 7 can be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each can be connected to bus 4 by one or more data media interfaces.

Memory 3 may include at least one program product having one or more program modules that are configured to carry out functions of embodiments of the present disclosure. By way of example, program/utility 8, having a set (at least one) of program modules 9, may be stored in memory 3, as well as an operating system, one or more application programs, other program modules, and program data. Each of the operating system, one or more application programs, other program modules, and program data, or some combination thereof, may include an implementation of a networking environment. Program modules 9 generally carry out the functions and/or methodologies of embodiments of the present disclosure as described herein.

Computer 1 may also communicate with: one or more external devices 10 such as a keyboard, a pointing device, a display 11, etc.; one or more devices that enable a user to interact with computer 1; and/or any devices (e.g., network card, modem, etc.) that enable computer 1 to communicate with one or more other computing devices. Such communication can occur via Input/Output (I/O) interfaces 12. Also, computer 1 can communicate with one or more networks such as a local area network (LAN), a general wide area network (WAN), and/or a public network (e.g., the Internet) via network adapter 13. As depicted, network adapter 13 communicates with the other components of computer 1 via bus 4. Computer 1 may also communicate with additional processing apparatus 14, such as one or more GPUs (graphics processing units), FPGAs, or integrated circuits (ICs), for implementing embodiments of the invention. It should be understood that although not shown, other hardware and/or software components could be used in conjunction with computer 1. Examples include, but are not limited to: microcode, device drivers, redundant processing units, external disk drive arrays, RAID systems, tape drives, and data archival storage systems, etc.

Figure 2:
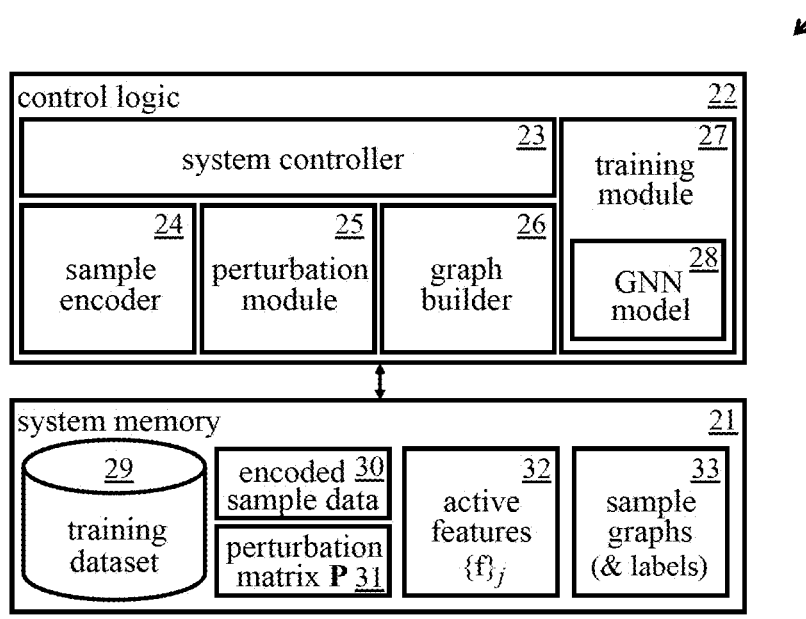
FIG. 2 illustrates component modules of an exemplary computing system for generating a multimodal data inference model, in accordance with some embodiments of the present disclosure.

Referring now to FIG. 2, shown is a schematic illustrating component modules of an exemplary computing system 20 embodying the present disclosure. The system 20 comprises memory 21 and control logic, indicated generally at 22, comprising functionality for generating a multimodal data inference model. The control logic 22 comprises a system controller 23, a sample encoder 24, a perturbation module 25, a graph builder 26, and a training module 27 for training a graph neural network (GNN) model 28. Each of the logic modules 24 through 27 comprises functionality for implementing particular steps of a model generation process detailed below. System controller 23 controls operation of these modules at various stages of the process. The logic modules interface with memory 21 which stores various data structures used in operation of system 20. These data structures include a dataset 29 of multimodal training data samples, encoded sample data 30 produced by sample encoder 24 for each training sample, a perturbation matrix 31 produced by perturbation module 25 for each sample, a set of active features 32 identified for each sample, and a set of sample graphs 33 which are generated by graph builder 26 for respective training samples.

In general, functionality of logic modules 23 through 27 may be implemented by software (e.g., program modules) or hardware or a combination thereof. Functionality described may be allocated differently between system modules in other embodiments, and functionality of one or more modules may be combined. The component modules of computing system 20 may be provided in one or more computers of a computing system. For example, all modules may be provided in a user computer 1, or modules may be provided in one or more computers/servers to which user computers can connect via a network (which may comprise one or more component networks and/or internetworks, including the Internet) to upload training datasets for generation of user-specific models. System memory 21 may be implemented by one or memory/storage components associated with one or more computers of computing system 20.

Figure 3:
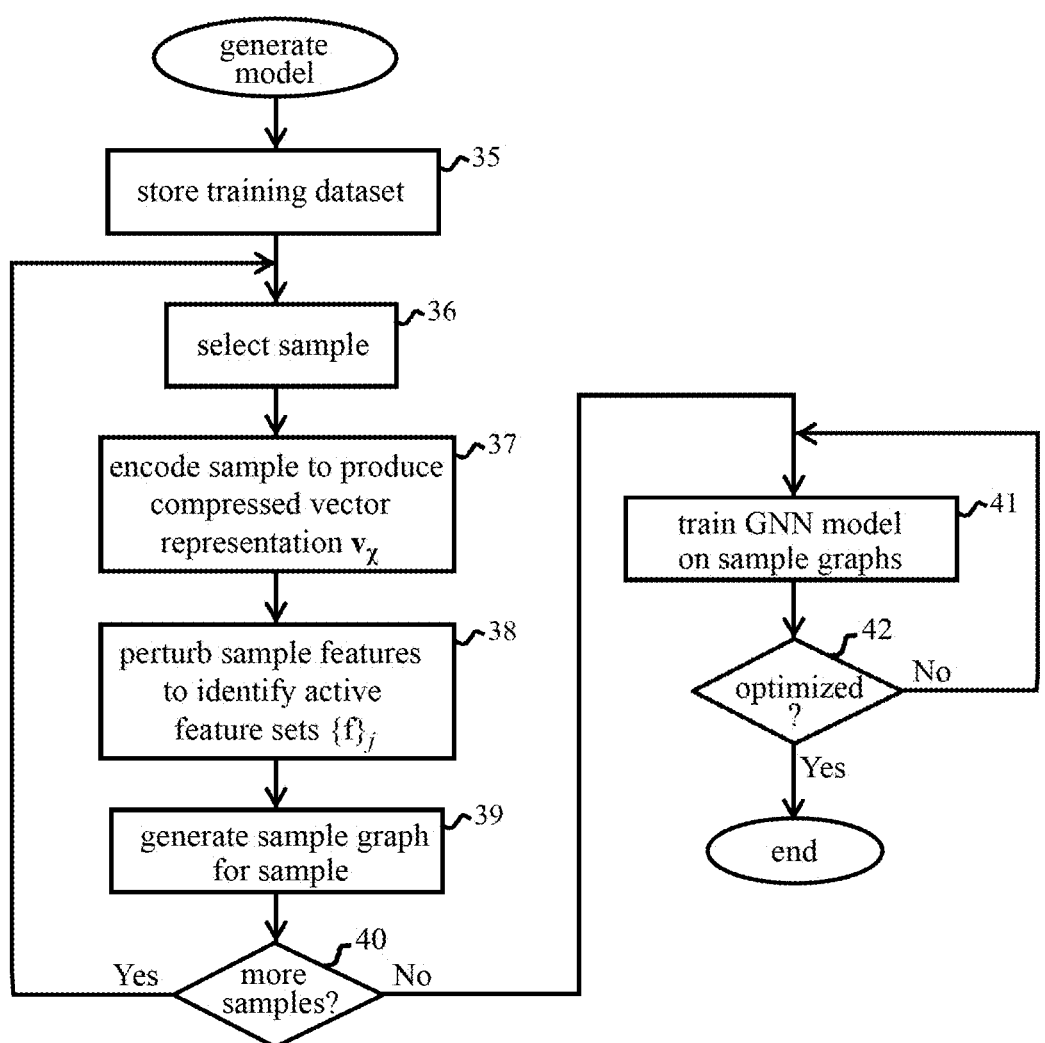
FIG. 3 illustrates steps of a model generation method, in accordance with some embodiments of the present disclosure.

Operation of system 20 is illustrated in the flow diagram of FIG. 3. Referring now to FIG. 3, step 35 represents storage in system memory 21 of the training dataset 29 for an application-specific inference task. Such a task typically involves assigning an input data sample to one of a predetermined set of classes (classification) or assigning a value to the sample on some predefined scale (regression). Each training sample in dataset 29 comprises a multimodal data sample, containing a plurality of data modalities (e.g., image data, text data, sensor outputs, etc., depending on the application), and a corresponding ground truth label which indicates the correct inference result (e.g., classification or regression value) for that data sample. In step 36, the system controller 23 supplies a data sample from dataset 29 to sample encoder 24. In step 37, the sample encoder 24 encodes the sample to produce encoded sample data 30. This encoded sample data comprises a compressed vector representation of the sample in a k-dimensional latent space. This vector representation, denoted here by $v_\chi$, thus comprises k vector elements, denoted herein by $v_{\chi j}$, j=1 to k, each defining a value in a respective one of the k-dimensions of a latent space $\chi$. The vector $v_\chi$ provides a compressed sample representation in that the number of dimensions k is less than the dimensionality (number of data values) in the original, unencoded data sample. Depending on the particular encoding process in sample encoder 24, an additional vector $v_m$ (produced by an initial stage of an encoding process detailed below) may also be stored in sample data 30 for the sample.

Next, in step 38, the perturbation module 25 perturbs features of the current sample to identify a set of "active" sample features, denoted by $\{f\}_j$, for each dimension j=1 to k of the latent space $\chi$. The active features for dimension j comprise those features perturbation of each of which produces more than a threshold change in the vector representation $v_\chi$ for the sample in that dimension. Features perturbed here may be features of the original data sample or, more preferably, features of the transformed sample after an initial encoding stage. The perturbation process, explained in more detail below, generates a perturbation matrix P which is stored at 31 in system memory 21. The active features $\{f\}_j$ are identified from this perturbation matrix and stored at 32 in memory 21.

In step 39, the graph builder 26 generates a sample graph for the current sample. This sample graph has nodes interconnected by edges, where the nodes comprise nodes representing respective features of the sample which were perturbed in step 38, and edges interconnecting nodes indicate the active features $\{f\}_j$ for each dimension j of $\chi$. Construction of the sample graph is described in more detail below. The resulting sample graph is stored at sample graphs 33 in system memory 21 along with the training label for the corresponding sample. In decision step 40, system controller 23 decides if there are more samples to be processed in dataset 29. If so, operation reverts to step 36 and steps 37 to 39 are repeated for the next training sample. When sample graphs have been generated for all training samples at decision step 40, operation proceeds to step 41. Here, training module 27 uses the sample graphs 33, and their associated training labels, to train the GNN model 28 to perform the inference task for the application in question. Training continues until a convergence condition, indicating that the model has been optimized for the inference task, is satisfied at decision step 42, whereupon the process terminates. The resulting, trained GNN model 28 can then be applied to perform inference on sample graphs generated from new multimodal data samples for the application in question.

Figure 4:
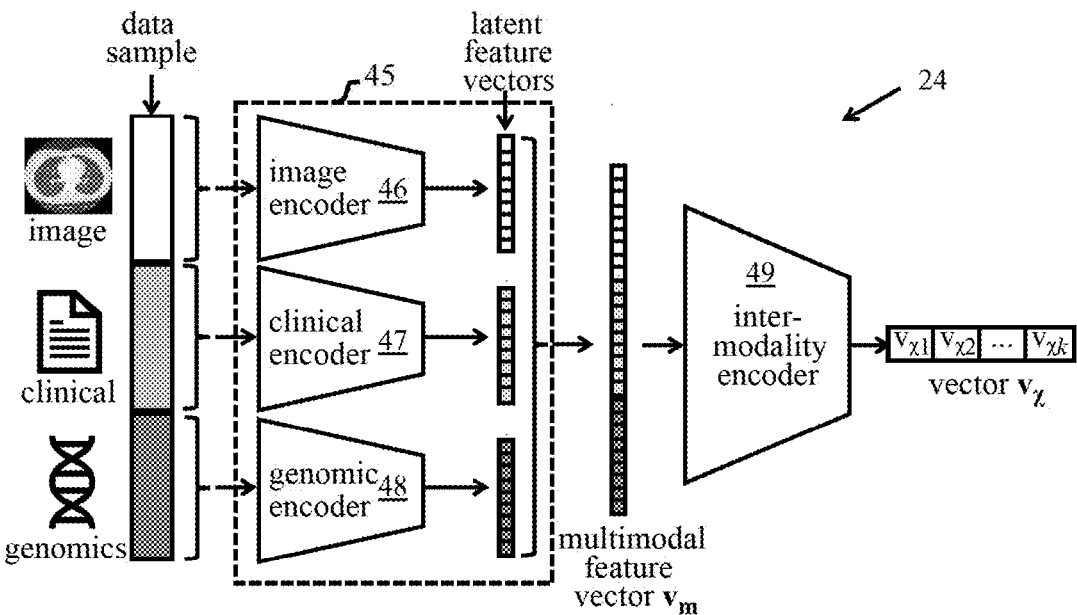
FIG. 4 illustrates a sample encoding operation in an embodiment of the model generation method.
Figure 5A:
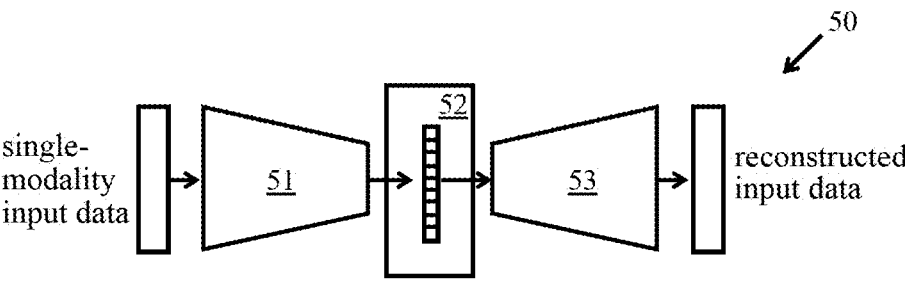
FIG. 5A and FIG. 5B illustrate pretraining architectures for encoders used in the FIG. 4 encoding operation, in accordance with some embodiments of the present disclosure.

Steps of the FIG. 3 process are explained in more detail in the following. Referring now to FIG. 4, shown is a schematic illustration of an encoding process performed by sample encoder 24 in a preferred embodiment. Here, the sample encoder 24 comprise first and second encoding stages. The first encoding stage 45 comprises a set of intra-modality encoders, one for each modality of data in a training data sample. In the illustration shown, training samples contain data in three modalities, indicated by different shading in the figure, namely: image data, here a medical image of a patient; text data containing clinical information on the patient; and genomics data for the patient. Each modality of data is input to a corresponding intra-modality encoder, e.g., an image encoder 46, a clinical encoder 47 and a genomic encoder 48. Each of these encoders has been pretrained in a respective autoencoder architecture for the corresponding data modality as illustrated schematically in FIG. 5A. Autoencoders (AEs) are well known in the art and need not be described in detail here. Briefly, however, the AE 50 of FIG. 5A comprises an encoder network 51 which encodes the single-modality input data into a feature vector corresponding to a point in a latent space, indicated at 52, of reduced dimensions compared to the input data. The latent feature vector obtained from encoder 51 is then supplied as the input to a decoder network 53 which aims to reconstruct the original input data supplied to encoder 51. The architecture of AE 50 is adapted to accommodate the input data dimensionality for a given modality, and the dimensionality of latent space 52 can be optimized in known manner. The AE 50 is trained in a self-supervised manner using a training dataset of data samples for the data modality in question, with the network weights being iteratively updated in order to minimize the reconstruction error at the output of decoder 53. The encoder

51 is thus trained to map single-modality input samples to a reduced-dimension latent-feature vector with minimal loss of information. After successful training in the AE architecture, the decoder 53 is discarded and encoder 51 provides the intra-modality encoder for encoding stage 45 of FIG. 4.

Figure 5B:
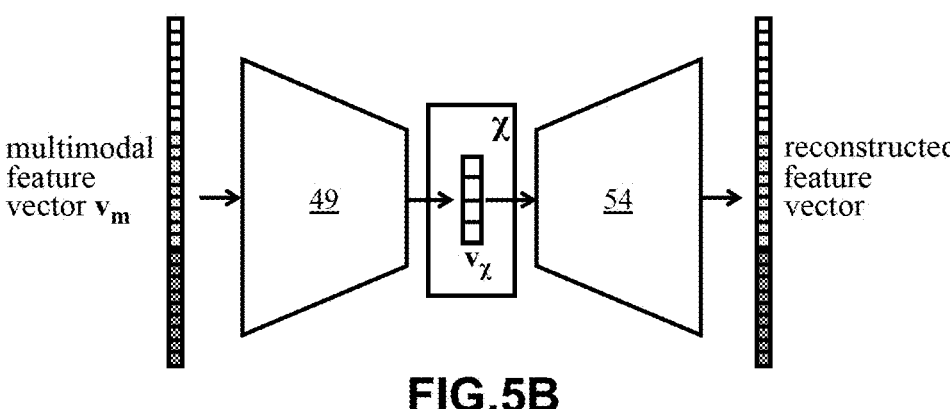

The latent feature vectors output by intra-modality encoders 46 to 48 are concatenated at the output of encoding stage 45 to obtain a multimodal feature vector, denoted here by $v_m$. The multimodal vector $v_m$ is then input to a second encoding stage implemented by inter-modality encoder 49. This encoder 49 is pretrained in an AE architecture for such multimodal feature vectors, comprising encoder network 49 and decoder network 54 as illustrated in FIG. 5B, whereby encoder 49 is trained to map multimodal feature vectors $v_m$ to their vector representations $v_\chi$ in the latent space $\chi$ with minimal information loss.

Figures 6, 7:
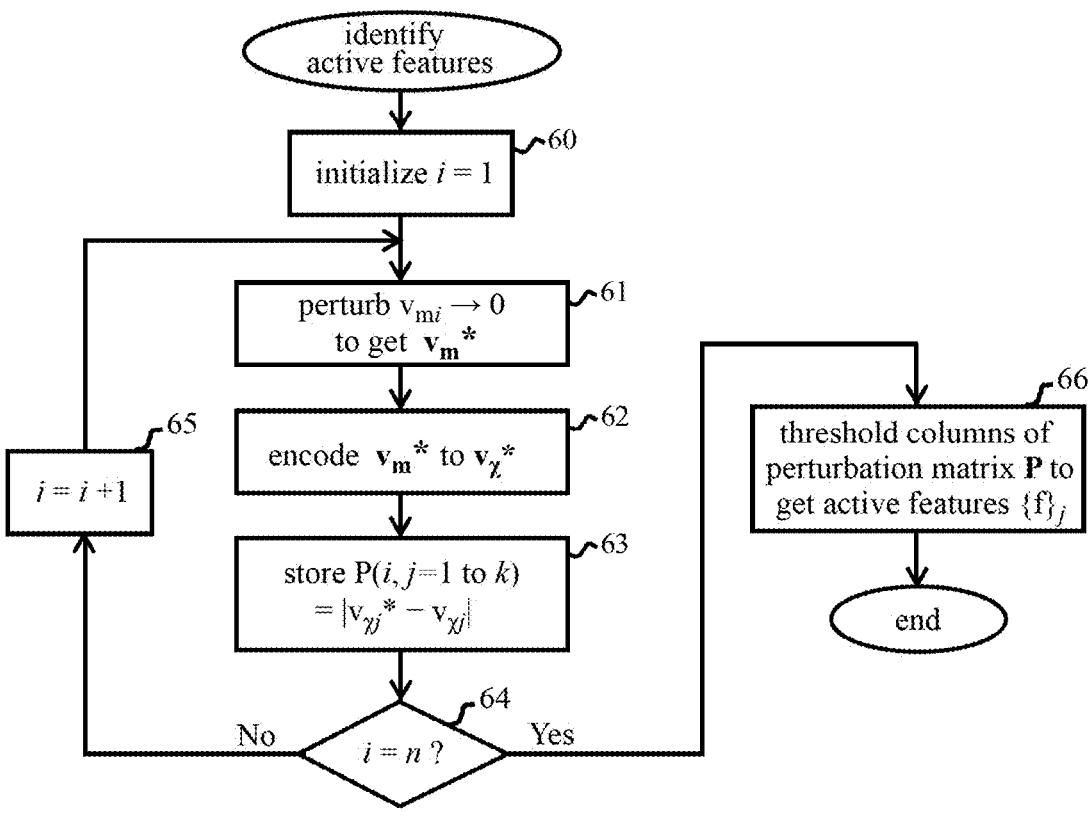
FIG. 6 illustrates steps of a perturbation process for identifying active sample features in the FIG. 3 method, in accordance with some embodiments of the present disclosure.
FIG. 7 depicts a schematic illustrating active features identified for a sample, in accordance with some embodiments of the present disclosure.

Referring now to FIG. 6, shown is operation of perturbation module 25 in a preferred embodiment. In this example, the perturbed sample features are features of the multimodal feature vector $v_m$ for the sample. The feature vector $v_m$ is thus stored by sample encoder 24, along with vector $v_\chi$, as encoded sample data 30. This feature vector $v_m$ comprises n vector elements, denoted here by $v_{mi}$, i=1 to n. In step 60 of FIG. 6, variable i is initialized to one. In step 61, the perturbation module 25 modifies the feature vector $v_m$ to $v_m*$ by perturbing element $v_{mi}$ of $v_m$, here by setting $v_{mi}$=0. In step 62, the perturbation module supplies $v_m*$ to the inter-modality encoder 49 of sample encoder 24 to obtain a modified vector representation $v_\chi*$ corresponding to $v_m*$. In step 63, the perturbation module 25 then computes elements P(i, j=1 to k) in an $i^{th}$ row of the perturbation matrix P as:

$$P(i,j)=|v_{\chi j}*-v_{\chi j}|,$$

where $v_{\chi j}*$ is the $j^{th}$ element of $v_\chi*$ and $\|$ denotes modulus. Each matrix element P(i,j) thus indicates the change in the vector representation $v_\chi$, in dimension j of latent space $\chi$, resulting from perturbation of the feature $v_{mi}$. If i≠n at decision step 64, i is incremented in step 65 and steps 61 to 63 are repeated, perturbing the next element $v_{mi}$ of $v_\chi$ to compute the next row P(i, j=1 to k) of perturbation matrix P. The process thus iterates, setting each feature $v_{mi}$ in turn to zero, until i=n at decision step 64 and the perturbation matrix P is complete. Operation then proceeds to step 66 where, for j=1 to k, a threshold TH is applied to the $j^{th}$ column of matrix P to identify the values of i for which P(i,j)>TH. The resulting values of i for each dimension j identify the active features $v_{mi}$ for that dimension. The features so identified are stored at 32 in system memory as the active feature sets $\{f\}_j$ for the sample.

Referring now to FIG. 7, shown is a schematic illustrating how the perturbation process effectively generates an "active feature map", mapping the active features $\{f\}_j$ of the multimodal sample vector $v_m$ in each dimension of latent space $\chi$ (here with k=4 dimensions). The resulting map is then used by graph builder 26 as indicated in FIG. 8.

Referring now to FIG. 8, shown are steps of sample graph generation process in the FIG. 3 method. In step 70 the graph builder defines nodes of the sample graph corresponding to respective multimodal features $v_{mi}$ for the sample. Node attributes here comprise the respective values of $v_{mi}$. In step 71, for each dimension j of $\chi$, the graph builder defines edges interconnecting the active features $\{f\}_j$ for that dimension. Edges indicating active features for different dimensions can be distinguished in the sample graph, e.g., via edge attributes defining different types of edge for different dimensions j. The resulting sample graph is then stored at step 72 for the sample.

Figure 9C:
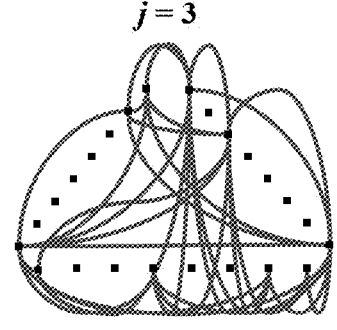
Figure 9D:
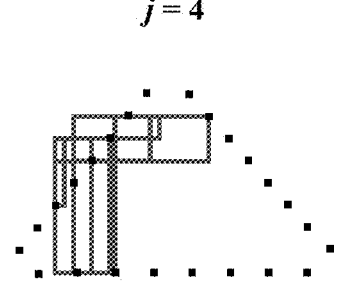
Figure 9E:
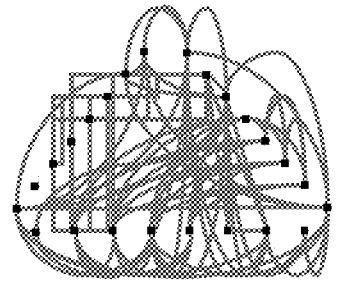

Referring now to FIG. 9A though 9E, shown is the graph building process for training samples with three data modalities, and a latent space $\chi$ with k=4, according to the active feature map of FIG. 7. In FIG. 9A, dots represent nodes corresponding to features of $v_m$. Here, nodes are shown arranged along sides of a triangle where the three sides represent features derived from respective data modalities. Edges connecting nodes in FIG. 9A indicate the four active features in dimension j=1 from the FIG. 7 map. FIG. 9B, FIG. 9C, and FIG. 9D illustrate edges interconnecting active features in dimensions j=2, 3 and 4 respectively. The final sample graph is illustrated in FIG. 9E as a superposition of the subgraphs for the four dimensions j. This multimodal sample graph can be fully defined by the node attributes for the n nodes of the graph and a set of four n-by-n binary adjacency matrices $A_j$, one for each dimension j, where a "1" at position (p, q) in a matrix indicates an edge between node p and node q for that dimension.

Figure 10:
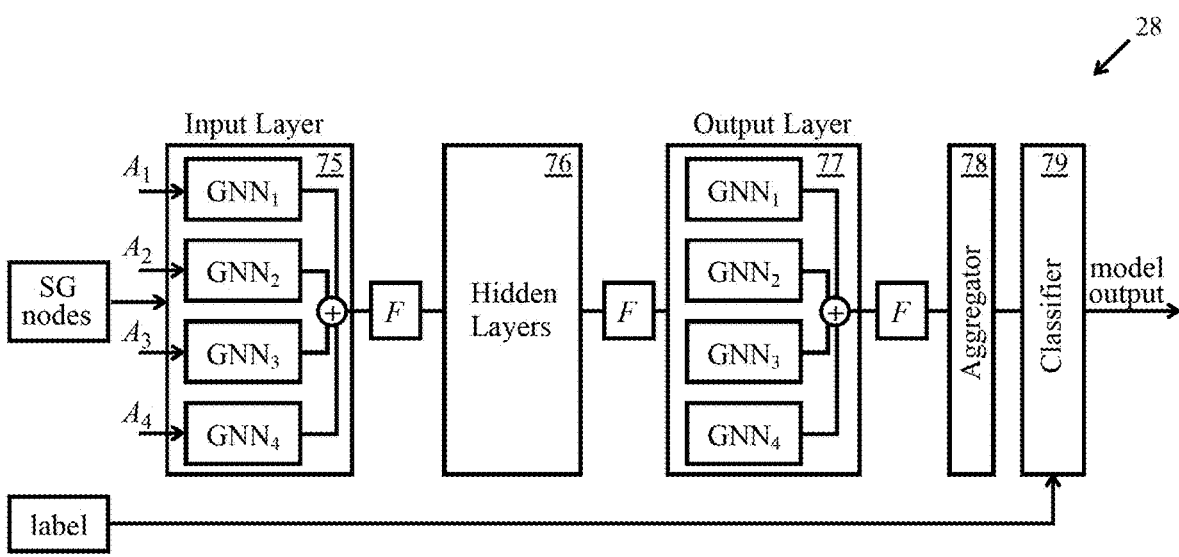
FIG. 10 illustrates training of a graph neural network model in an embodiment of the FIG. 3 method.

Referring now to FIG. 10, shown is training of GNN model 28 in step 41 of FIG. 3. The model 28 is adapted to receive an input sample graph and to produce node embeddings for the graph via a message passing process. Message passing (MP) is a well-known technique in GNN architectures via which "messages" are passed between nodes of a graph and the "state" of each node is iteratively updated based on the messages that node receives. Node states are defined here by their respective attributes $v_{mi}$, and a message is defined as some function of the attributes of that node's neighbors (reachable via an edge) in the graph. The node state is then updated as some function of its current state and the received message. Messages are passed iteratively, whereby all node states are successively updated with each MP step to obtain the final node embeddings. In the FIG. 10 example, GNN model 28 comprises a layer 75 of input neurons, a plurality of "hidden" neuron layers indicated schematically at 76, and a layer 77 of output neurons (where the "neurons" may be implemented, in general, in hardware or software to perform the required MP calculations in each network layer). Successive network layers are interconnected via an activation unit which applies an activation function F, here a ReLU function, to the output node states from each layer. In the present example, where edges for different dimensions j are defined by respective adjacency matrices $A_j$, each network layer 75 through 77 comprises four separate GNN layers, labelled $GNN_1$ though $GNN_4$, one for each of the k=4 dimensions. Neurons in each GNN layer $GNN_1$ of input layer 75 receive the node states ("SG nodes") for respective sample graph nodes, and each layer $GNN_1$ receives the corresponding adjacency matrix $A_j$. Messages are then passed between input layer neurons according to the adjacency matrices for each layer $GNN_1$, and corresponding node states at the outputs of layers $GNN_1$ are then summed to obtain the node states output to the next, hidden layer 76. Messages are then similarly relayed through successive hidden layers 76 according to the adjacency matrices $A_j$, and the node states are updated in each step according to the particular MP algorithm employed. Output layer 77 provides the final node states which, via activation unit F, provide the output node embeddings for the sample graph.

While the GNN layer structure can be based on any convenient GNN architecture (e.g., graph attention networks (GAT), message passing neural networks (MPNN), and temporal graph networks (TGN)), preferred embodiments may employ a GCN (Graph Convolutional Network) architecture, e.g., using Graph Isomorphism Network (GIN) layers. The number of hidden layers 76, and hence message passing steps, can be determined by the dimension n of the sample graphs. A variety of MP algorithms may also be employed here, such as a sum of the node states, or a sum in combination with the computation of the divergence or curl, e.g. the sum of the curl of the node states to be aggregated during the message passing step.

The node embeddings output by the GNN are aggregated (e.g., concatenated or otherwise combined) in an aggregator module 78 to provide the final embedding for each sample graph. The resulting graph embedding is input to an evaluator which provides the model output, here a classifier 79 for a classification task. Classifier 79 can be implemented in known manner, conveniently as a simple feedforward neural network. Classifier 79 also receives the training label associated with the input sample graph. The model 28 can thus be trained to correctly classify input subgraphs via a well-known supervised learning process. In this process, the training module 27 supplies subgraphs iteratively to the model, and the model parameters (e.g., neural network weights in the message passing layers) are progressively updated via an optimization process (e.g., a gradient descent method) based on backpropagation of errors between the model output and the subgraph label so as to reduce the output error. For this training operation, training module 27 typically splits sample graphs 33 into training, validation and test sets, where the training set is used for initial model training, the validation set is used to fine-tune model parameters, and the test set is used to assess final model performance. Training continues until a convergence condition (e.g., a minimal output error) is achieved. When training is complete, the GNN model 28 can be applied for inference to new multimodal data samples for the application in question.

Figure 11:
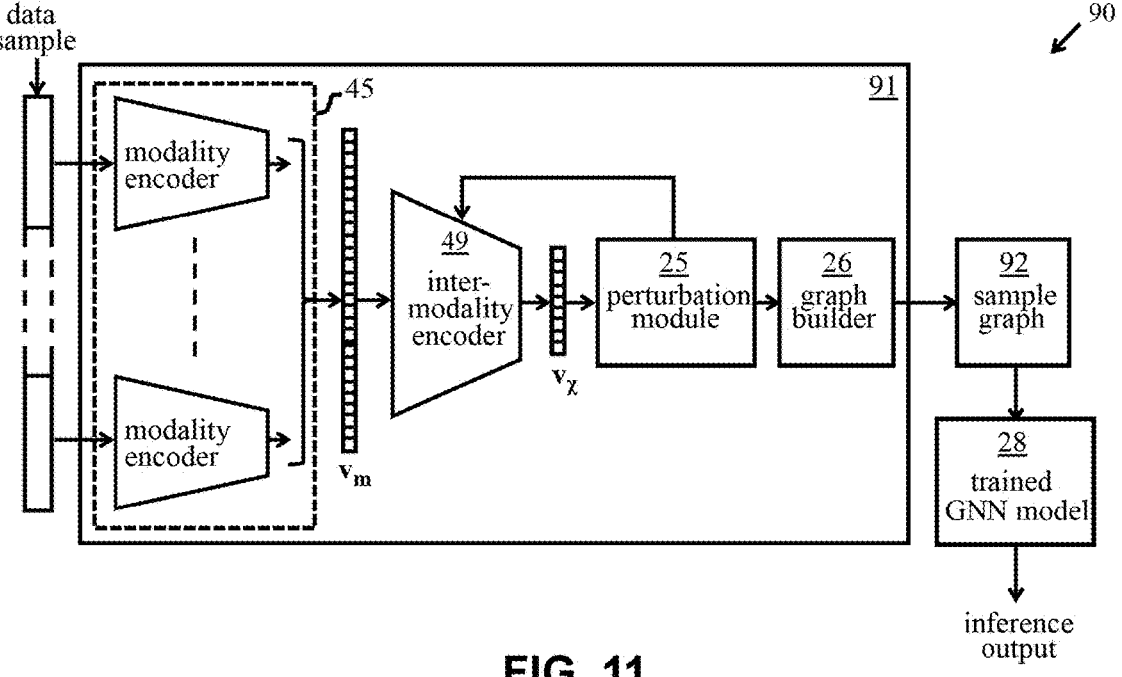
FIG. 11 illustrates architecture of a multimodal data inference system produced using the FIG. 3 method, in accordance with some embodiments of the present disclosure.

Referring now to FIG. 11, shown is an example architecture of the multimodal data inference system 90, where features described above are indicated by like reference numerals. The system 90 comprises a sample graph generator 91 which generates a sample graph from an input multimodal data sample and supplies the sample graph to the pretrained GNN model 28. The sample graph generator comprises the sample encoder 24 (here the two-stage encoder of FIG. 4), the perturbation module 25 which derives the active feature sets $\{f\}_j$ for the input sample, and graph builder 26 which generates a multimodal sample graph 92 as described above. The GNN model thus processes the sample graph via the message passing process described above to produce an inference output, here a classification result, for the input sample.

The techniques described above provide a highly efficient system for generating multimodal data inference models. Typical training processes for ML models are extremely compute-intensive, involving inherently complex processing of massive training datasets. This problem is exacerbated when the training process must accommodate multiple data modalities. The above techniques allow different data modalities to be combined so that an ML task can be solved optimally and with reduced computational effort. The different data modalities are fused and transformed into sample graphs with an optimal structure for message passing in the GNN. The sample graph structure provides a compressed representation identifying the most active latent features of each sample, whereby message passing in the GNN focusses on these active features. Messages can be passed between inter-modality features as well as intra-modality features, enabling highly efficient processing of relevant evidence from all modalities. By optimally fusing data modalities, GNN training is substantially simplified, significantly reducing compute resources required to generate effective models, and reducing silicon area consumed by GNN models employing hardware implementations. The resulting inference system extracts the optimal multimodal feature representation from samples for efficient processing in the trained GNN, without constraints based on modelling choice (e.g., a fixed number of possible features to be combined in a convolutional neural network model with a given kernel size). The two-stage encoding of FIG. 4 also reduces dimensionality of the fused samples and allows active features to be derived from a reduced feature space in the perturbation process, further simplifying sample graphs for optimized processing in GNN 28.

Operation of the FIG. 11 system 90 was evaluated in relation to outcome prediction after treatment of tuberculosis patients. The training dataset used was the Tuberculosis (TB) Portals data with multiple data modalities characterising patients. The available sources were clinical data (containing a mixture of clinical, demographic, and regimen-related data), computerized tomography (CT) annotations, and genomic SNP (Single Nucleotide Polymorphisms) data, with parallel data available for 3051 patients. The target variable for the inference task was the outcome, belonging to one of five classes: Cured, Failure (patient did not follow required regimen), Still on treatment, Completed (patient completed required regimen), Died. The CT and genomics data was organized as categorical features, while the demographic, regimen and clinical data were a mixture of categorical and continuous features. The continuous variables were grouped together, providing a total of six modalities, either entirely continuous or entirely categorical.

Figures 12, 13, 14:
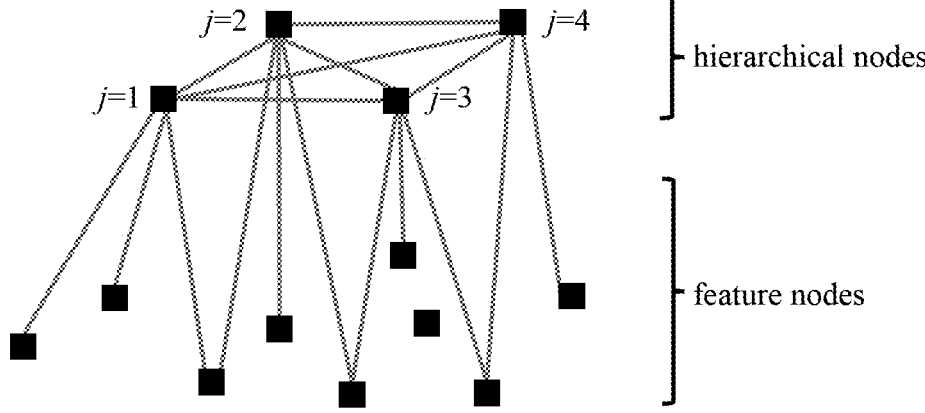
FIG. 12 describes a training dataset used in an application of the system in accordance with some embodiments of the present disclosure.
FIG. 13 shows results of a classification operation for the application, in accordance with some embodiments of the present disclosure.
FIG. 14 illustrates sample graph construction in an embodiment of the system.

Intra-modality encoders (see FIG. 4), were trained in AE architectures, designed independently for each modality, to perform dimensionality reduction under self-supervision. These intra-modality encoders were optimized on a squared reconstruction loss of the single-modality data in the training set. The autoencoders were designed as two-layered MLPs (Multilayer Perceptrons) with tied weights. Any missing features were dropped out of the optimization. The search-space of the bottleneck dimensionality (dimensionality of latent space 52 in FIG. 5A) was restricted based on the rank of each data covariance matrix and the knee point of its eigenspectrum. FIG. 12 describes the training dataset with native dimension, rank and reduced dimension for each data modality. The resulting multimodal feature vector $v_m$ for each training sample contained 32+32+8+128+64+4=268 elements.

The dimensionality k at the output of inter-modality encoder 49 (FIG. 4) was selected as k=24. The threshold TH for active feature identification was set to TH=0.8. A single layer R-GCN (Recurrent-GCN) architecture was employed in GNN Model 28 for this evaluation. FIG. 13 illustrates the fraction of correct inference results in each of the five sample classes, giving an overall model accuracy of 71% even with a simple, single-layer R-GCN in model 28.

Embodiments of the present disclosure can be applied to numerous inference tasks in the healthcare field, where multimodal data samples comprise multimodal medical data for patients and the inference task provides some type of medical evaluation for a patient. Multimodal medical data may comprise data obtained from tissue specimens, different modality images/scans and/or other measurements or results of tests on patients, along with various other patient-specific data e.g. demographic/lifestyle data, and so on. Medical evaluation may, for example, comprise diagnosis, prognosis, treatment selection/treatment evaluation for particular patients in the field of personalized medicine, and may involve any ML inference task such as classification, e.g., disease identification/sub-typing, etc., or regression, e.g., severity grading, longevity prediction, and so on.

It will be appreciated that embodiments can be applied to advantage in numerous other technical applications where multimodal data samples comprise multimodal measurement data for a physical system, and the inference task comprises evaluating a state of the system. The physical system may be an entity such as a vehicle or other machine, or some other technological system such as a computer network, and the task may be to determine a state of the system for controlling system operation, e.g. selecting an action in operation of an autonomous vehicle. Applications can also be envisaged in which the physical system is a biological entity such as person, where the task may be to verify identity of a person based on multimodal biometric data, or determine the emotional state of person based on multimodal expression, gesture, posture, voice, etc., measurements from image/audio data. In other applications, the physical system may be a natural system such as a weather system, geological system, etc., with the task being weather prediction, seismic event prediction, and so on. Technical applications in other fields, e.g., AI automation, can also be envisaged as will be apparent to those skilled in the art.

Various changes and modifications can of course be made to the embodiments described above. By way of example, edges need not be typed to distinguish different dimensions, whereby a single adjacency matrix is then defined for the sample graph. Some embodiments might also perturb features of the original input data samples rather than latent sample features, particularly for multimodal samples with low dimensionality. This offers greater "explainability" for model operation at the expense of increased sample graph complexity.

Sample graphs may be constructed in other ways to indicate active features for message passing in the GNN.

Referring now to FIG. 14, shown is a simple schematic showing an alternative construction in which the sample graph includes a node ("hierarchical node") representing each dimension j of $\chi$, along with nodes ("feature nodes") representing elements of $v_m$. Edges indicating active features for each dimension j interconnect the hierarchical node representing that dimension with feature nodes representing the active features in that dimension. Additional edges interconnect the hierarchical nodes for dimensions j to allow message passing between modalities.

In some embodiments, edges may be weighted based on the change in $v_\chi$ produced by perturbation of active features. In FIG. 14, for instance, a weight can be defined for each edge interconnecting a hierarchical node for dimension j and a feature node representing an active feature, with this weight being dependent on the amount of change in $v_\chi$ produced by perturbation of that active feature. Edge weights then contribute to the updated node states during message passing, allowing the degree of "activeness" of features to be accommodated in this process.

During training of the GNN model 28, some embodiments may further train the intra-modality and inter-modality encoders in dependence on the output error of the GNN. The backpropagation process then extends back to these encoders to further refine the encoder weights for the particular inference task.

In general, where features are described herein with reference to a method embodying the invention, corresponding features may be provided in a system/computer program product embodying the invention, and vice versa.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method for generating a machine learning model for a multimodal data inference task, the method comprising, for each sample in a training dataset including a plurality of data samples having different modalities:

encoding the sample to produce a compressed vector representation of the sample in a k-dimensional latent space;

perturbing features of the sample to identify, for each of a plurality of dimensions of the k-dimensional latent space, a set of active features, perturbation of each of which produces more than a threshold change in the compressed vector representation in that dimension;

generating an active feature map based on the set of active features using each of the plurality of dimensions of the k-dimensional latent space;

creating a node map having a plurality of sides, each side of the node map including a plurality of nodes from a respective one of the different modalities of the training dataset, wherein the nodes represent respective features of the sample;

for each of the plurality of dimensions of the k-dimensional latent space and based on the active feature map, creating a sub-sample graph defining edges interconnecting the nodes of the node map for that dimension, wherein the edges indicate the active features for each dimension;

generating a sample graph by superimposing each of the sub-sample graphs for each of the plurality of dimensions; and using the sample graph to train a graph neural network model to perform the multimodal data inference task.

2. The computer-implemented method of claim 1, further comprising:

after training the graph neural network model, performing the multimodal data inference task for a second multimodal data sample by generating a second sample graph for the second multimodal data sample and supplying that second sample graph to the graph neural network model to obtain an inference output for the second multimodal data sample.

3. The computer-implemented method of claim 1, wherein encoding the sample to produce the compressed vector representation comprises:

for each modality of data in the sample, encoding that data using an intra-modality encoder, pretrained in an autoencoder architecture for that data modality, to produce a latent feature vector;

concatenating the latent feature vectors for the sample to obtain a multimodal feature vector; and encoding the multimodal feature vector using an inter-modality encoder, pretrained in an autoencoder architecture for such multimodal feature vectors, to produce the compressed vector representation of the sample.

4. The computer-implemented method of claim 3, further comprising:

perturbing features of the multimodal feature vector for the sample to identify the set of active features for each dimension.

5. The computer-implemented method of claim 4, further comprising:

perturbing features of the multimodal feature vector by setting each feature in turn to zero.

6. The computer-implemented method of claim 3, further comprising:

pre-training the intra-modality encoder and the inter-modality encoder in the respective autoencoder architectures.

7. The computer-implemented method of claim 3, further comprising:

during training of the graph neural network, further training the intra-modality encoder and the inter-modality encoder in dependence on an output error of the graph neural network.

8. The computer-implemented method of claim 1, wherein edges indicating active features for different dimensions of the k-dimensional latent space are distinguished in the sample graph.

9. The computer-implemented method of claim 8, wherein:

the sample graph includes a node representing each dimension of the k-dimensional latent space;

edges indicating active features for each dimension interconnect the node representing that dimension with nodes representing those active features; and the sample graph includes additional edges interconnecting the nodes representing the dimensions.

10. The computer-implemented method of claim 9, wherein a weight is defined in the sample graph for each edge interconnecting a node representing a dimension and a node representing an active feature, the weight being dependent on the amount of change in the vector representation produced by perturbation of that active feature.

11. The computer-implemented method of claim 1, wherein, for each dimension of the k-dimensional latent space, nodes representing active features for that dimension are interconnected by edges in the sample graph.

12. The computer-implemented method of claim 11, wherein different types of edges are defined in the sample graph to indicate active features for different dimensions of the k-dimensional latent space.

13. The computer-implemented method of claim 1, wherein each multimodal data sample comprises multimodal medical data for a patient, and wherein the multimodal data inference task provides a medical evaluation.

14. The computer-implemented method of claim 1, wherein each multimodal data sample comprises multimodal measurement data for a physical system, and wherein the multimodal data inference task comprises evaluating a state of the system.

15. A computer program product for generating a machine learning model for a multimodal data inference task, the computer program product comprising a computer readable storage medium having program instructions embodied therein, the program instructions being executable by a computing system to cause the computing system, for each sample in a training dataset of multimodal data samples, to:

encode the sample to produce a compressed vector representation of the sample in a k-dimensional latent space;

perturb features of the sample to identify, for each of a plurality of dimensions of the k-dimensional latent space, a set of active features, perturbation of each of which produces more than a threshold change in the compressed vector representation in that dimension;

generate an active feature map based on the set of active features using each of the plurality of dimensions of the k-dimensional latent space;

create a node map having a plurality of sides, each side of the node map including a plurality of nodes from a respective one of the different modalities of the training dataset, wherein the nodes represent respective features of the sample;

for each of the plurality of dimensions of the k-dimensional latent space and based on the active feature map, create a sub-sample graph defining edges interconnecting the nodes of the node map for that dimension, wherein the edges indicate the active features for each dimension;

generate a sample graph by superimposing each of the sub-sample graphs for each of the plurality of dimensions; and use the sample graph to train a graph neural network model to perform the multimodal data inference task.

16. The computer program product of claim 15, wherein the program instructions are further executable to cause the computing system, after training the graph neural network model, to perform the multimodal data inference task for a second multimodal data sample by generating a second sample graph for the second multimodal data sample and supplying that second sample graph to the graph neural network model to obtain an inference output for the second multimodal data sample.

17. The computer program product of claim 15, wherein the program instructions are executable to cause the computing system to encode the sample to produce the compressed vector representation by:

for each modality of data in the sample, encoding that data using an intra-modality encoder, pretrained in an autoencoder architecture for that data modality, to produce a latent feature vector;

concatenating the latent feature vectors for the sample to obtain a multimodal feature vector; and encoding the multimodal feature vector using an inter-modality encoder, pretrained in an autoencoder architecture for such multimodal feature vectors, to produce the compressed vector representation of the sample.

18. The computer program product of claim 17, wherein the program instructions are executable to cause the computing system to perturb features of the multimodal feature vector for the sample to identify the set of active features for each dimension.

19. A multimodal data inference system comprising:

a sample graph generator adapted to, for each sample in a training dataset including a plurality of data samples having different modalities:

encode an input multimodal data the sample to produce a compressed vector representation of the sample in a k-dimensional latent space, perturb features of the sample to identify, for each of a plurality of dimensions of the k-dimensional latent space, a set of active features, perturbation of each of which produces more than a threshold change in the compressed vector representation in that dimension, generate an active feature map based on the set of active features using each of the plurality of dimensions of the k-dimensional latent space;

create a node map having a plurality of sides, each side of the node map including a plurality of nodes from a respective one of the different modalities of the training dataset, wherein the nodes represent respective features of the sample;

for each of the plurality of dimensions of the k-dimensional latent space and based on the active feature map, create a sub-sample graph defining edges interconnecting the nodes of the node map for that dimension, wherein the edges indicate the active features for each dimension;

generate a sample graph by superimposing each of the sub-sample graphs for each of the plurality of dimensions; and a graph neural network model, pretrained to perform a multimodal data inference task using sample graphs generated by the sample graph generator for respective samples in a training dataset of multimodal data samples;

wherein the sample graph generator is adapted to supply the sample graph for the input multimodal data sample to the graph neural network model to obtain an inference output for the sample.

20. The system of claim 19, wherein the sample graph generator is adapted to encode the input sample to produce the compressed vector representation by:

for each modality of data in the sample, encoding that data using an intra-modality encoder, pretrained in an autoencoder architecture for that data modality, to produce a latent feature vector;

concatenating the latent feature vectors for the sample to obtain a multimodal feature vector; and encoding the multimodal feature vector using an inter-modality encoder, pretrained in an autoencoder architecture for such multimodal feature vectors, to produce the compressed vector representation of the sample.

* * * * *